United States Patent
Lyman

(10) Patent No.: US 8,098,810 B2
(45) Date of Patent: Jan. 17, 2012

(54) INTELLIGENT PRESENCE MANAGEMENT IN A COMMUNICATION ROUTING SYSTEM

(75) Inventor: Christopher M. Lyman, Los Angeles, CA (US)

(73) Assignee: Fonality, Inc., Culver City, CA (US)

( * ) Notice: Subject to any disclaimer, the term of this patent is extended or adjusted under 35 U.S.C. 154(b) by 938 days.

(21) Appl. No.: 12/069,083

(22) Filed: Feb. 6, 2008

(65) Prior Publication Data

US 2009/0141884 A1    Jun. 4, 2009

Related U.S. Application Data

(63) Continuation-in-part of application No. 11/827,314, filed on Jul. 11, 2007.

(60) Provisional application No. 60/906,024, filed on Mar. 9, 2007.

(51) Int. Cl.
*H04M 3/00* (2006.01)
(52) U.S. Cl. .............. 379/265.04; 379/265.09; 709/206
(58) Field of Classification Search .............. 379/265.04, 379/265.09; 709/206
See application file for complete search history.

(56) References Cited

U.S. PATENT DOCUMENTS

| | | | |
|---|---|---|---|
| 5,533,110 A | 7/1996 | Pinard et al. |
| 5,754,636 A | 5/1998 | Bayless et al. |
| 5,854,834 A | 12/1998 | Gottlieb et al. |
| 6,104,711 A | 8/2000 | Voit |
| 6,137,869 A | 10/2000 | Voit |
| 6,282,574 B1 | 8/2001 | Voit |
| 6,359,880 B1 | 3/2002 | Curry |
| 6,418,214 B1 | 7/2002 | Smythe et al. |
| 6,430,275 B1 | 8/2002 | Voit |
| 6,430,289 B1 | 8/2002 | Liffick |
| 6,628,765 B1 | 9/2003 | Bangs et al. |
| 6,718,030 B1 | 4/2004 | Turner et al. |
| 6,820,083 B1 | 11/2004 | Nagy et al. |
| 6,964,370 B1 | 11/2005 | Hagale et al. |
| 7,007,074 B2 | 2/2006 | Radwin |
| 7,031,442 B1 | 4/2006 | Neyman et al. |
| 7,035,619 B1 | 4/2006 | Fargano et al. |
| 7,035,923 B1 | 4/2006 | Yoakum et al. |
| 7,039,165 B1 | 5/2006 | Saylor et al. |
| 7,065,184 B2 | 6/2006 | Vishik et al. |
| 7,076,036 B1 | 7/2006 | Johnson |

(Continued)

FOREIGN PATENT DOCUMENTS

WO    2004049121 A2    6/2004

(Continued)

OTHER PUBLICATIONS

Inter-Tel, Inc. "Advanced Applications Design Guide for Contact Center Suite." Issue 1. Apr. 2006.

(Continued)

*Primary Examiner* — Creighton Smith
(74) *Attorney, Agent, or Firm* — Carr & Ferrell LLP

(57) ABSTRACT

Systems and methods for intelligent presence management in a communication routing system are provided. In exemplary embodiments, an inbound communication may be received for a user. The user's presence status is determined and a profile associated with the user is reviewed. Based on rules contained within the profile, appropriate instructions may be generated for routing the inbound communication in accordance with some embodiments. In other embodiments, instructions may be generated to log the user in or out with the communication routing system.

20 Claims, 7 Drawing Sheets

U.S. PATENT DOCUMENTS

| | | | |
|---|---|---|---|
| 7,089,237 | B2 | 8/2006 | Turnbull et al. |
| 7,092,509 | B1 | 8/2006 | Mears et al. |
| 7,120,238 | B1 | 10/2006 | Bednarz et al. |
| 7,136,875 | B2 | 11/2006 | Anderson et al. |
| 7,274,781 | B2 | 9/2007 | Lipton et al. |
| 7,333,976 | B1 | 2/2008 | Auerbach et al. |
| 7,477,730 | B2 | 1/2009 | Starbuck et al. |
| 7,496,185 | B1 | 2/2009 | Primavesi et al. |
| 7,496,189 | B2 | 2/2009 | Clarisse et al. |
| 7,536,000 | B2 | 5/2009 | Ho |
| 7,567,662 | B1 | 7/2009 | Renner |
| 7,664,096 | B2 | 2/2010 | Doherty et al. |
| 7,664,495 | B1 | 2/2010 | Bonner |
| 7,706,522 | B2 | 4/2010 | Shaffer |
| 7,711,104 | B1 | 5/2010 | Flockhart |
| 7,716,263 | B2 | 5/2010 | Masek |
| 7,835,510 | B2 | 11/2010 | Akachi |
| 7,844,677 | B1 * | 11/2010 | Asher et al. ................... 709/206 |
| 7,881,454 | B2 | 2/2011 | Tuchman et al. |
| 7,920,549 | B2 | 4/2011 | Alt et al. |
| 2002/0029258 | A1 | 3/2002 | Mousseau et al. |
| 2002/0035605 | A1 | 3/2002 | McDowell et al. |
| 2002/0116336 | A1 | 8/2002 | Diacakis et al. |
| 2002/0120687 | A1 | 8/2002 | Diacakis et al. |
| 2003/0009530 | A1 | 1/2003 | Philonenko et al. |
| 2003/0078986 | A1 | 4/2003 | Ayres et al. |
| 2003/0228010 | A1 | 12/2003 | Clarisse et al. |
| 2004/0039889 | A1 | 2/2004 | Elder et al. |
| 2004/0062383 | A1 | 4/2004 | Sylvain |
| 2004/0088356 | A1 | 5/2004 | Sellen et al. |
| 2004/0093387 | A1 | 5/2004 | Wick |
| 2004/0133888 | A1 | 7/2004 | Ard et al. |
| 2004/0170267 | A1 | 9/2004 | Seligmann |
| 2004/0203944 | A1 | 10/2004 | Huomo et al. |
| 2004/0246331 | A1 | 12/2004 | Caspi et al. |
| 2004/0260771 | A1 | 12/2004 | Gusler et al. |
| 2004/0267887 | A1 | 12/2004 | Berger et al. |
| 2005/0068166 | A1 | 3/2005 | Baker |
| 2005/0068227 | A1 | 3/2005 | Caspi et al. |
| 2005/0074101 | A1 | 4/2005 | Moore et al. |
| 2005/0076095 | A1 | 4/2005 | Mathew et al. |
| 2005/0105709 | A1 | 5/2005 | Dutronc et al. |
| 2005/0201362 | A1 | 9/2005 | Klein et al. |
| 2005/0209861 | A1 | 9/2005 | Hewes et al. |
| 2005/0220283 | A1 | 10/2005 | Ho |
| 2005/0239501 | A1 | 10/2005 | Idnani et al. |
| 2005/0243978 | A1 * | 11/2005 | Son et al. ................... 379/88.13 |
| 2005/0246588 | A1 | 11/2005 | Deng et al. |
| 2006/0019655 | A1 | 1/2006 | Peacock |
| 2006/0039545 | A1 | 2/2006 | Rahman et al. |
| 2006/0093099 | A1 | 5/2006 | Cho |
| 2006/0093121 | A1 | 5/2006 | Sylvain |
| 2006/0109811 | A1 | 5/2006 | Schotten et al. |
| 2006/0121916 | A1 | 6/2006 | Aborn et al. |
| 2006/0147009 | A1 | 7/2006 | Greenlee et al. |
| 2006/0166678 | A1 | 7/2006 | Karaoguz et al. |
| 2006/0167747 | A1 | 7/2006 | Goodman et al. |
| 2006/0177032 | A1 | 8/2006 | Abramson et al. |
| 2006/0185004 | A1 | 8/2006 | Song |
| 2006/0195532 | A1 | 8/2006 | Zlateff et al. |
| 2006/0210046 | A1 | 9/2006 | Smith |
| 2006/0212519 | A1 | 9/2006 | Kelley et al. |
| 2006/0256789 | A1 | 11/2006 | Otto |
| 2006/0256942 | A1 | 11/2006 | Gatzke et al. |
| 2006/0288099 | A1 | 12/2006 | Jefferson et al. |
| 2007/0011337 | A1 | 1/2007 | Brown et al. |
| 2007/0061197 | A1 | 3/2007 | Ramer et al. |
| 2007/0078708 | A1 | 4/2007 | Yu et al. |
| 2007/0204218 | A1 | 8/2007 | Weber et al. |
| 2007/0217434 | A1 | 9/2007 | Welbourn |
| 2007/0244973 | A1 | 10/2007 | Pearson |
| 2007/0264977 | A1 | 11/2007 | Zinn et al. |
| 2007/0268506 | A1 | 11/2007 | Zeldin |
| 2008/0025316 | A1 | 1/2008 | Zampiello et al. |
| 2008/0103907 | A1 | 5/2008 | Maislos et al. |
| 2008/0130856 | A1 | 6/2008 | Ku et al. |
| 2008/0147831 | A1 | 6/2008 | Redjaian et al. |
| 2008/0162701 | A1 | 7/2008 | Ryabchun |
| 2008/0215428 | A1 | 9/2008 | Ramer et al. |
| 2008/0219423 | A1 | 9/2008 | Lyman |
| 2008/0222174 | A1 | 9/2008 | Lyman |
| 2008/0222549 | A1 * | 9/2008 | Lyman ........................ 715/771 |
| 2008/0222656 | A1 | 9/2008 | Lyman |
| 2008/0275785 | A1 | 11/2008 | Altberg et al. |
| 2008/0313543 | A1 | 12/2008 | Altberg et al. |
| 2009/0012373 | A1 * | 1/2009 | Raij et al. ...................... 600/300 |
| 2009/0022149 | A1 | 1/2009 | Rosenberg et al. |
| 2009/0043657 | A1 | 2/2009 | Swift et al. |
| 2009/0076917 | A1 | 3/2009 | Jablokov et al. |
| 2009/0080411 | A1 | 3/2009 | Lyman |
| 2009/0100047 | A1 | 4/2009 | Jones et al. |
| 2009/0106427 | A1 | 4/2009 | Plumb |
| 2009/0141884 | A1 | 6/2009 | Lyman |
| 2010/0174807 | A1 | 7/2010 | Lyman |
| 2010/0211660 | A1 | 8/2010 | Kiss et al. |
| 2010/0232585 | A1 | 9/2010 | Lyman |
| 2010/0235223 | A1 | 9/2010 | Lyman |

FOREIGN PATENT DOCUMENTS

| | | |
|---|---|---|
| WO | 2005036330 A2 | 4/2005 |
| WO | 2006020168 A2 | 2/2006 |

OTHER PUBLICATIONS

Hull, et al., Enabling Context-Aware and Privacy-Conscious User Data Sharing, 2004, Proceedings of the 2004 IEEE International Conference on Mobile Data Management.

Broder, et al., Search Advertising Using Web Relevance Feedback, 2008, pp. 1013-1022, Conference on Information and Knowledge Management, Proceeding of the 17th AC conference on Information and Knowledge Management.

"What is Xact View?" Xact View User Guide, Schmooze Communications LLC 2008. www.schmooze.com.

"Enhanced Enterprise Communication: Transforming the bank into a proactive relationship center.", May 2004.

"Network Intelligence for Presence Enhanced Communication.", Nov. 2001.

"Presence Aggregation in Endpoints.", Jan. 15, 2003.

* cited by examiner

US 8,098,810 B2

INTELLIGENT PRESENCE MANAGEMENT IN A COMMUNICATION ROUTING SYSTEM

CROSS-REFERENCE TO RELATED APPLICATION

The present application is a continuation-in-part application of U.S. patent application Ser. No. 11/827,314, filed Jul. 11, 2007 and entitled "System and Method for Centralized Presence Management of Local and Remote Users," which claims priority benefit of U.S. Provisional Patent Application No. 60/906,024 filed Mar. 9, 2007, and entitled "Real-Time Call Management System," both of which are hereby incorporated by reference. The present application is also related to U.S. patent application Ser. No. 11/506,279, filed Aug. 17, 2006 and entitled "Mobile Use of a PBX System," which is also hereby incorporated by reference.

BACKGROUND OF THE INVENTION

1. Field of the Invention

Embodiments of the present invention relate generally to presence management and more particularly to intelligent presence management in a communication routing system.

2. Description of Related Art

Often time, an availability of a user to receive a phone call is important during business hours. This may be especially important in a call center or customer service department where calls need to be queued up for a next available agent (i.e., user).

Conventionally, the user may forward their calls when they expect to be away from their desk phone. For example, the user may forward calls to their mobile phone. However, the process for forwarding calls is manual. That is, the user must know in advance that they will be away from their desk phone, and must spend time configuring their desk phone to perform the forwarding function.

Alternatively, if the user is not available to answer their desk phone, the call may be forwarded to an answering service or answering device. In these cases, the answering service or answering device will take a message for the user, which the user may retrieve at a later time. However, some instances of these call forwarding mechanisms may require the user to manually indicate that the calls should be forwarded to the answering service or answering device. Other instances require the desk phone be contacted first and after no answer, the call is forwarded to the answering service or device.

As a result of the above mention problems, there is a need for a systems that can intelligently direct communications in an automated manner.

SUMMARY OF THE INVENTION

Embodiments of the present invention provide systems and methods for intelligent presence management in a communication routing system. In exemplary embodiments, an inbound communication is received for a user. The inbound communication may comprise a phone call, e-mail, chat message, or any other type of communication that may be available for the user.

The user's presence status is then determined. In exemplary embodiments, the presence status may comprise presence information received from one or more presence detection modules. The presence information may comprise a presence indication signal which may include a unique identifier on a on a wireless network, Bluetooth, wimax, or any other unique identifier using a wireless protocol. A detection method could also include indication of keyboard and mouse movement or any other information which may indicate the presence or absence of a user within a user area (i.e., presence status).

Based on the detected presence status of the user, instructions may be generated to forward the inbound communication to an appropriate communication device. In exemplary embodiments, a user profile associated with the user is reviewed to determine communication routing rules based on the presence status. Appropriate instructions are then generated for forwarding the inbound communication accordingly.

In yet other embodiments, the user maybe logged in or out with the communication routing system (e.g., logged in or out of their communication devices and/or a communication queue of a call center) based on the presence status. For example, if no presence is detected after a predetermined period of time, the user may be logged out of the communication queue of the call center. In other embodiments, prolonged absence of the user may trigger routing of inbound communications to an alternative person (e.g., another user at a call center or designated out-of-office contact).

DETAILED DESCRIPTION OF EXEMPLARY EMBODIMENTS

Embodiments of the present invention provide systems and methods for intelligent presence management in a communication routing system. In accordance with one embodiment, the communication routing system is associated with a call center (e.g., a customer service center). In exemplary embodiments, a centralized server device receives presence information for a user. Inbound communications may be routed to a predetermined communication device associated with the user based on a user profile and the presence information. Alternatively or in addition, the user may be logged in and out with the communication routing system based on their presence information.

Figure 1:
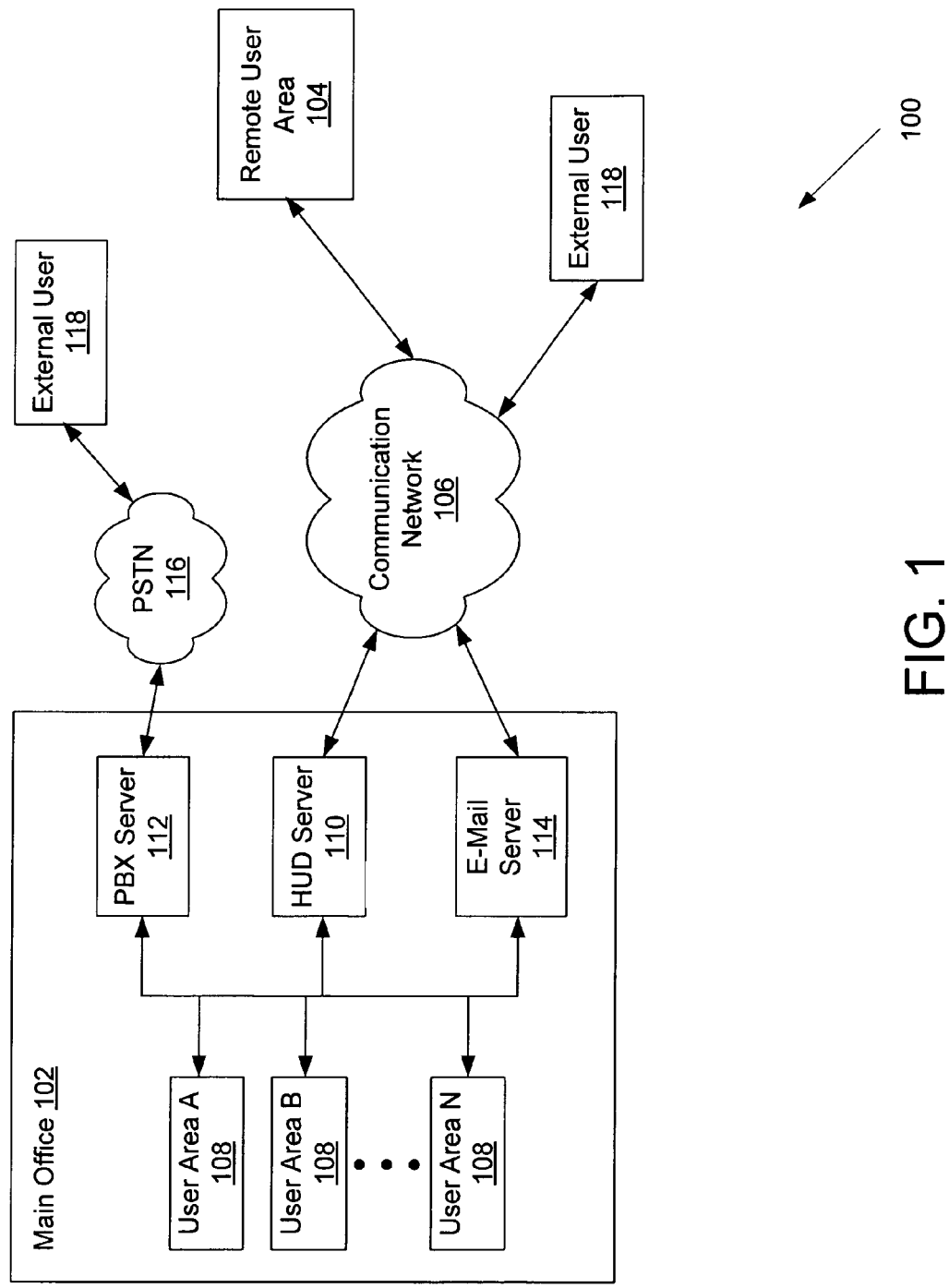
FIG. 1 is a diagram of an exemplary environment in which embodiments of the present invention may be practiced.

FIG. 1 shows an exemplary environment 100 in which embodiments of the present invention may be practiced. The exemplary environment 100 comprises a main office 102 and a remote user area 104 coupled in communication via a communication network 106. The communication network 106 may comprise the Internet or any other wide area network.

The main office 102 comprises one or more user areas 108. Each user areas 108 may be coupled, via a computing device, to a heads-up display (HUD) server 110, a PBX server 112, and/or an e-mail server 114. In an alternative embodiment, the HUD server 110, PBX server 112, and e-mail server 114 may be comprised within more or few server devices. For example, the HUD server 110, PBX server 112, and e-mail server 114 may be embodied within a single communication server device. Furthermore, other communication server devices may be provided for management and/or monitoring of other forms of communications.

Each user area 108 may be associated with a user (e.g., employee). The user area 108 may comprise one or more communication devices of the user that are configured to operate in connection with the various communication server devices (e.g., servers 110-114). The user area 108 will be discussed in more detail in connection with FIG. 2 below.

In accordance with one embodiment, the HUD server 110 comprises the presence and communication management system of the present invention. The HUD server 110 will be discussed in more detail in connection with FIG. 3 below. It should be noted that the presence and communication management system can be embodied on a separate, distinct server (e.g., a presence management server) apart from the HUD server 110.

The PBX server 112 is configured to manage telephone calls in and out of the main office 102. For example, when the external user 118 places a telephone call to the main office 102, the telephone call is routed through the PSTN 116 to the PBX server 112. From there, the telephone call may be routed to a proper user associated with the main office 102. Additionally, the PBX server 112 may monitor and/or manage calls of the remote user area 104 according to one embodiment.

In exemplary embodiments, the communication network 106 also couples the main office 102 to external user devices 118. These external user devices 118 may be associated with clients or customers of the main office 102 attempting to communicate with one or more users associated with the main office 102. In accordance with one embodiment, the external users are customers accessing a customer service center (e.g., call center) associated with the main office 102.

The exemplary e-mail server 114 may manage e-mail communications received and sent from the main office 102. Furthermore, the e-mail server 114, in accordance with one embodiment, may monitor and/or manage e-mails of the remote user area 104.

The optional remote user area 104 comprises a location of any individual (e.g., employee) associated with the main office 102 which is accessing the main office 102 externally. For example, the remote user area 104 may represent a home office. The remote user 104 may comprise one or more communication devices. In some embodiments, the remote communication devices may access the main office 102 via a remote router (not shown). It should be noted that "remote" as used herein refers to any environment external to a physical location of the main office 102. Accordingly in some embodiments, inbound communications to a user may be directed to the remote user area 104 when the user is not physically in the main office 102 based on the user's profile settings.

It should be noted that the embodiment of FIG. 1 is exemplary. Alternative embodiments may comprise any number of main offices 102, remote user areas 104, communication server devices 110-114, and external users 122 coupled in communication. In some embodiments, the presence management system may only be utilized within the main office 102 environment (i.e., no remote user area 104). To simplify discussion, the following detailed description will focus on embodiments in which the users are located within the main office 102.

Figure 2:
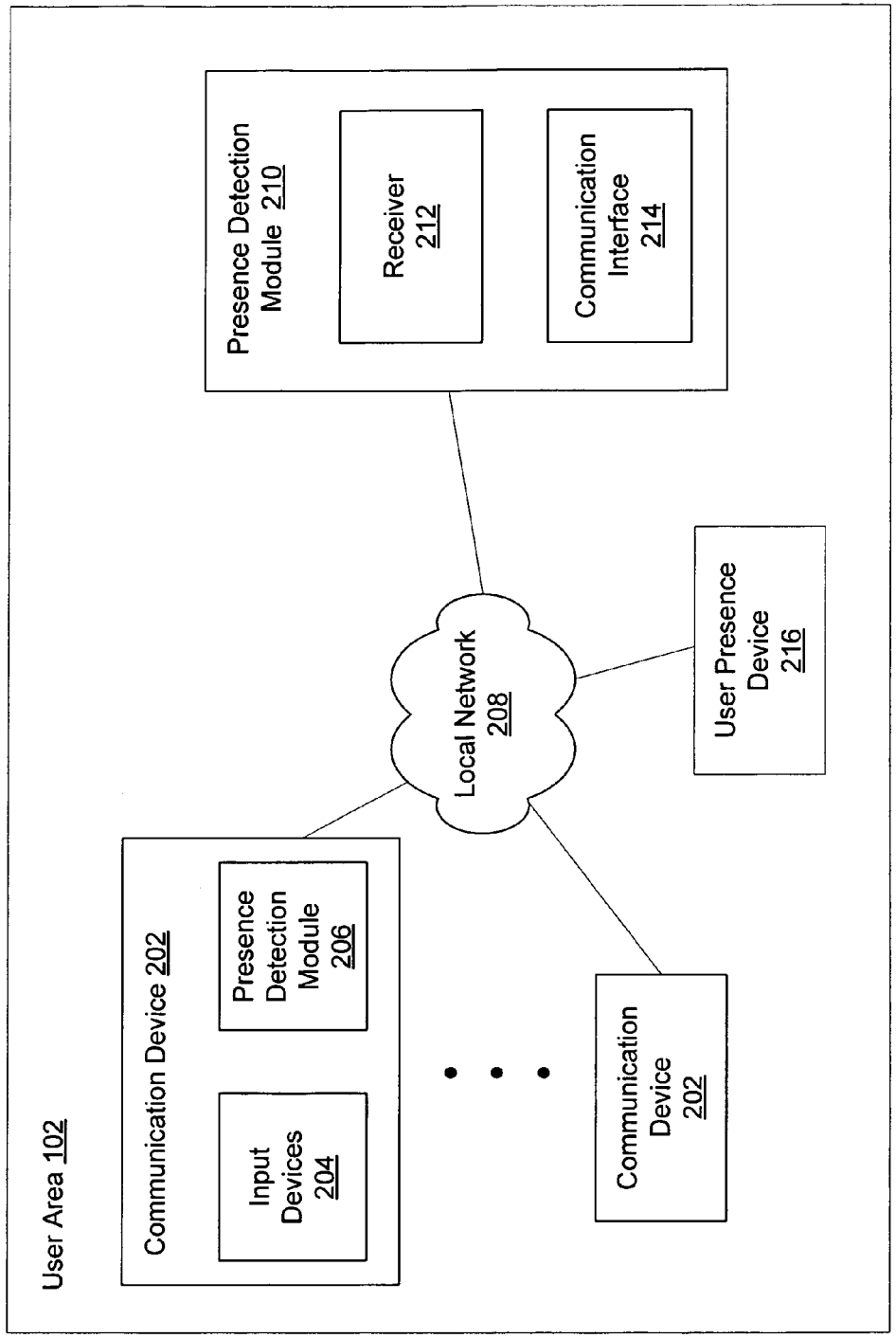
FIG. 2 is a diagram of exemplary user area.

Referring now to FIG. 2, the exemplary user area 108, which may also be applicable to the remote user area 104, is shown in more details. According to one embodiment, the user area 108 may represent a cubicle or office of the user. Alternatively, the user area 108 may be a desk or any other distinct space associated with the user.

In some embodiments, each user area 108 may be associated with a particular user. In other embodiments, the user area 108 may be used by more than one user. In both embodiments, the user area 108 may comprise or be associated with one or more communication devices 202. The communication devices 202 may comprise any devices that are enabled for communication, such as a desktop computer, a laptop, an analog phone, a mobile phone, or an IP phone. To simplify discussion, the following detailed description will focus on embodiments in which the communication devices 202 are computers and telephones. It should be noted that any number of communication devices 202 may be located within a user area 102.

In exemplary embodiments, the communication device 202 may include one or more input devices 204. In some embodiments, the communication device 202 may also comprise a presence detection module 206. The input devices 204 may comprise a keyboard and a mouse of a computing device according to one embodiment. In some embodiments, the presence detection module 206 may be configured to detect the presence of the user on the communication device 202 based on movement of the coupled input device(s) 204. For example, if the coupled mouse and keyboard has no activities for more than 15 minutes, then the presence detection module 206 may register the user as being away from their desk (e.g., user area 108), and thus may be unavailable to receive inbound communications at their desk.

In a further embodiment, one or more of the communication devices 202 may be coupled via a local network 208 to an optional, stand-alone presence detection module 210 (e.g., embodied within a separate unit). In some embodiments, the local network 208 may be a wireless network (e.g., Bluetooth, Wi-Fi, WiMax, infrared, etc.). Alternatively, the stand-alone presence detection module 210 may be connected (e.g., wired) to one or more communication devices 202.

According to exemplary embodiments, a receiver 212 of the presence detection device 210 or 206 (not shown) may periodically (e.g., every ten seconds) or constantly search for a presence indication signal from the communication device 202. In one example, the presence indication signal comprises a certain frequency (e.g., Bluetooth from a mobile phone) emitted by the communication device 202. When the communication device 202 is within a certain range of the receiver 212, the receiver 212 will detect the presence indication signal. Once received, the presence detection module 210 or 206 may send presence information (e.g., presence indication signal) to the HUD server 110 via, for example, a communication interface 214 of the stand-alone presence detection module 210 or via a communication interface of the communication device 202, itself.

According to another embodiment, the communication device 202 may comprise a desk phone coupled to the presence detection module 206 or 210. In this embodiment, the presence detection module 206 or 210 will detect when the desk phone is in use or not in use.

In a further embodiment, the user may carry a user presence device 216 on his/her person which will emit a presence indication signal or frequency that the presence detection module 206 or 210 detects. The user presence device 216 may comprise, for example, a key card or an employee ID card. When the user presence device 216 enters a certain proximity of the receiver 212 of the presence detection module 210 or 206, the presence indication signal emitted from the user presence device 216 is detected by the presence detection module 210.

In yet a further embodiment, the presence of the user may be determined via GPS. For example, the user may carry a communication device 202 or other user presence device 216. The presence detection module (e.g., embodied within a satellite) may then determine user location based on the location of the communication device 202 or the user presence device 216.

Figure 3:
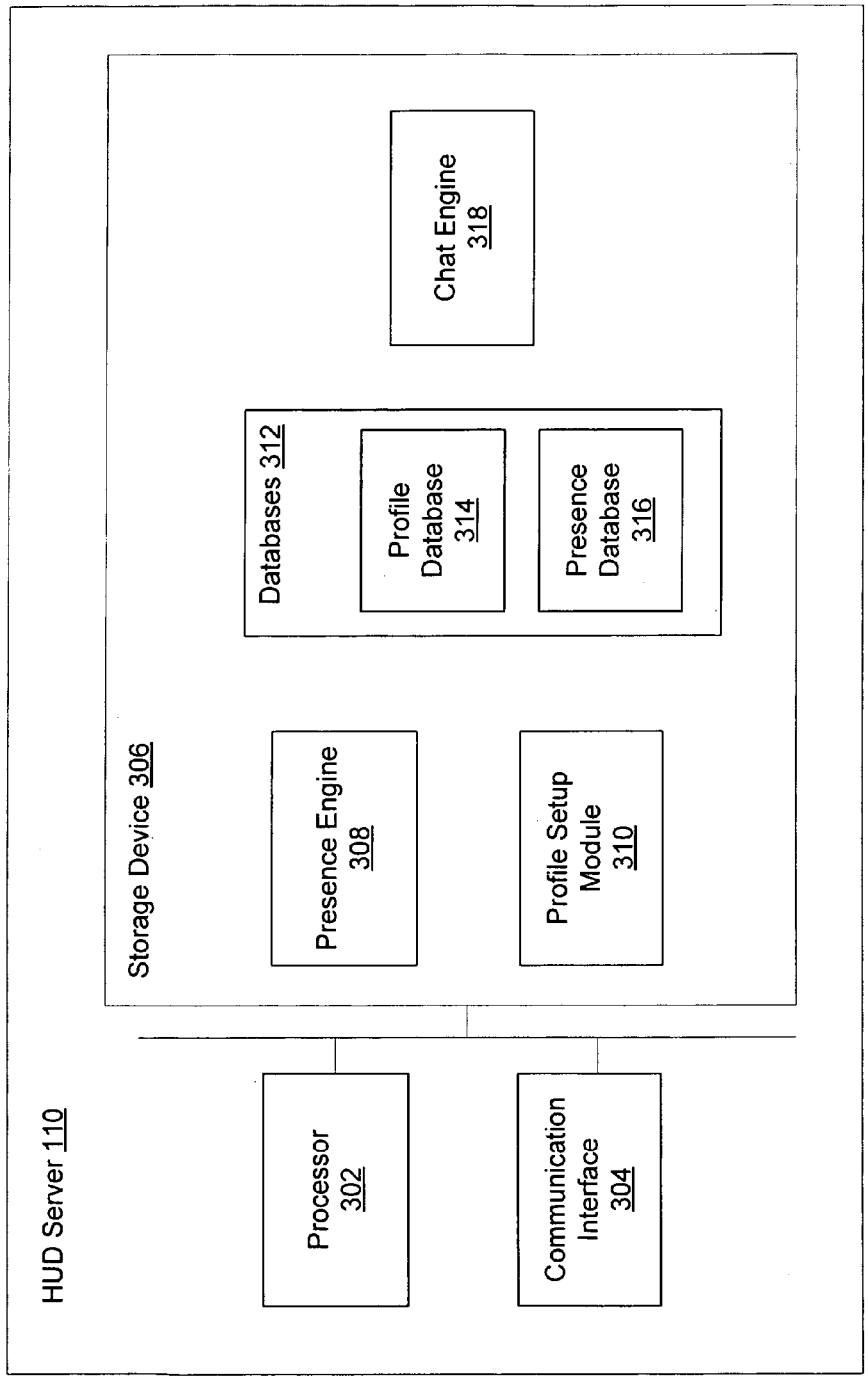
FIG. 3 is a block diagram of a HUD server, according to one embodiment of the present invention.

Referring now to FIG. 3, the exemplary HUD server 110 is shown in more details. The HUD server 110 may comprise a processor 302, a communication interface 304, and a storage device 306. The HUD server 110 may comprise other components not essential to the discussion of the intelligent presence management system. The communication interface 304 is configured to allow the HUD server 110 to communication with the communication network 106.

The storage device 306 may comprise a presence engine 308, a profile setup module 310, and a plurality of databases 312. These databases 312 may comprise a profile database 314 for storing profiles for each user and a presence database 316 for storing presence status of the users. The storage device 306 may, in accordance with some embodiments, comprise a chat engine 318. The exemplary chat engine 318 is enabled to provide chat functionality (e.g., forward chat messages from one user to one or more other users regardless of whether the users are local, remote, or external users) and may determine chat status. Alternative embodiments may comprise more, less, or functionally equivalent engines and modules.

The exemplary presence engine 308 is configured to perform the operations of embodiments of the intelligent presence system. As such, the presence engine 308 may determine the presence of users, and based on profiles and rules stored in the profile database 314, perform one or more actions accordingly. In some embodiments, the presence engine 308 may send instructions to log the user in or out of the communication routing system. In other embodiments, the presence engine 308 sends instructions to route inbound communications to a proper communication device of the user based on the user's profile or to an alternative user. The presence engine 308 will be discussed in more detail in connection with FIG. 4 below.

The profile setup module 310 is configured to establish a profile for each user. The profile may comprise a set of rules which indicate one or more actions to be performed based on the presence status of the user. In some embodiments, the profile may also indicate whether to log the users in or out of communication devices or communications servers, or log the user in or out with the communication routing system (e.g., a call queue of a call center) after a certain period of inactivity (e.g., lack of presence or activity). Furthermore, the rules may provide different routing and login options based on an amount of time the user is present/not present. For example, if the user is not present for 15 minutes, an inbound communication may be directed to the user's mobile device. However, if the user is not present for more than an hour, the user may be logged out of the communication system and/or the inbound communication may be sent to the user's home phone. Therefore, the profiles provide guidance based on the user's presence status within the communication routing system.

As provided, the profile may include a plurality of routing rules for when the user is present or away from their desk (e.g., user area 108). Thus, for example, a phone call may be routed to the user's desk phone when they are present at their user area 108, to the user's mobile phone during business hours when the user is not at their user area 108, and to the user's home phone in the evening. In a further example, the profile may indicate that e-mail and chat messages be forwarded to the user's mobile phone if the user is not at his desk for more than 15 minutes, or to Google Talk at home if the user is not at his desk for more than three hours. In accordance with exemplary embodiments, each profile may be individually customized such that each user may have a different set of routing and login rules.

In some embodiments, the profile setup module 310 may apply default rules for the user profile unless the user or their administrator changes the rules. For example, the default profile rules may include forwarding all inbound phone calls to a user's mobile phone when they are away from their user area 108 for more than ten minutes.

In accordance with one embodiment, the profile setup module 310 may be coupled in communication to the HUD server 110 as a web-based interface. As such, an individual (e.g., the user or the administrator) may access the profile setup module 310 from any location that provides web access. For example, the individual may make changes to existing profiles or set up new profiles from home. The profiles and rules may then be saved to a centralized database and/or be copied to the profile database 316 on the HUD server 110. In exemplary embodiments, the profiles are updated to the HUD server 110 in real-time. In yet a further embodiment, the profile setup module 310 may be embodied within the presence engine 308.

Figure 4:
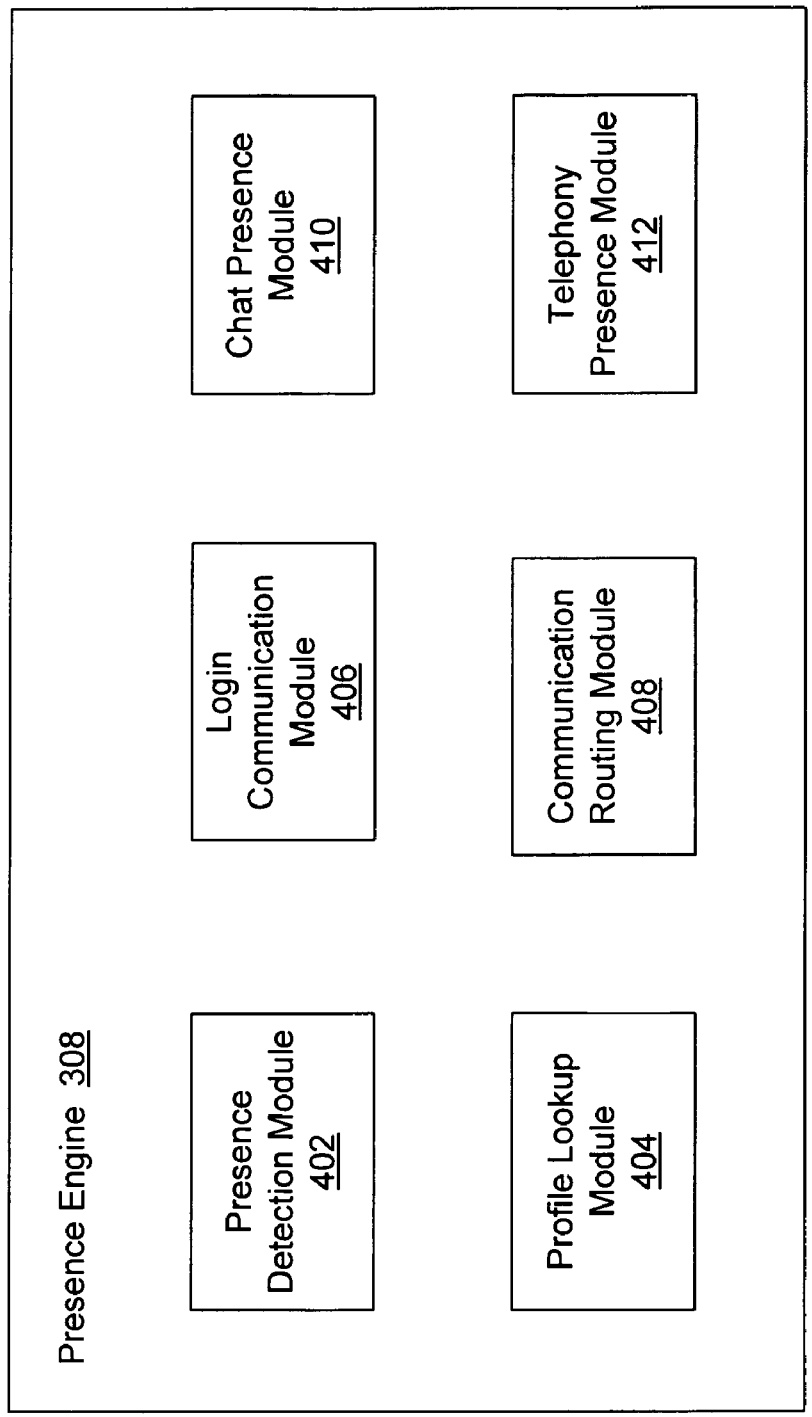
FIG. 4 is an exemplary presence engine.

Referring now to FIG. 4, a block diagram of the exemplary presence engine 308 is shown. The presence engine 308 is configured to determine the presence of users and based on profiles and rules stored in the profile database 314 perform actions associated with each user. These actions may comprise logging the user into or out of the communication routing system and/or routing inbound communications to the user based on their presence and profile rules. In exemplary embodiments, the presence engine 308 may comprise a presence status module 402, a profile lookup module 404, a login communication module 406, and a communication routing module 408. In some embodiments, the presence engine 308 may further comprise a chat presence module 410 and a telephony presence module 412. Alternatively, the chat and telephony presence modules 410 and 412 may be embodied within the presence status module 402, elsewhere in the HUD server 110, or not be present in the HUD server 110.

The presence status module 402 may be configured to receive presence information from the presence detection modules (e.g., 206 and/or 210). The presence information may be received in real time or periodically (e.g., every 10 seconds). In some embodiments, the presence status module 402 pings the various presence detection modules 206 and 210 for the presence information. In other embodiments, the presence detection modules 206 and 210 sends the presence information whenever a change in presence information is detected or at a predetermined time interval. The presence information may then be stored in the presence database 316.

If there is a change in presence information associated with one or more users or if an event occurs, the presence status module 402 may trigger the profile lookup module 404 to review the associated profile of the user to determine if any actions need to be performed. In some embodiments, the event may comprise receipt of an inbound communication or expiration of a predetermined time period. For example, the profile lookup module 404 may review the profile associated with a particular user that is currently receiving an inbound communication. In another embodiment, the profile lookup module 404 may review the profile if the user has not been present for more than a certain period of time to determine if the user should be logged off the communication routing system (e.g., logged out of a communication queue of a call center). Based on the rules found in the associated profile, the profile lookup module 404 may trigger the login communication module 406 or the routing communication module 408 to perform an action.

The login communication module 406 may be configured to send login instructions to the proper communication server based on the user's presence status. For example, suppose the profile indicates that if the user has been away from their user area 104 for more than an hour, then the user is to be logged off with the communication routing system (e.g., the main office 102 communication routing system) or logged off from receiving a queue call of a call center. In this situation, the login communication module 406 may generate and send instructions to appropriate communication servers to log the user out. Thus, for example, if the user is logged in to receive e-mails and phone calls, then the login communication module 312 may forward instructions to the e-mail server 114 and the PBX server 112 to log the user out.

The exemplary communication routing module 408 may be configured to send communication routing instruction(s) to the proper communication server(s) based on user's presence status. For example, suppose the profile indicates that if the user is away from their user area 108 for more than ten minutes, chat messages and e-mails should be routed to the user's mobile phone and phone calls routed to an alternative user. In this situation, the routing communication module 408 will generate and send instructions to the respective communication servers (e.g., the PBX server 112 for the phone call and the e-mail server 114 for e-mails) to route the inbound communication to the proper person/device. The communication routing module 408 may, in another example, generate instructions to route the inbound communication to a primary communication device 202 (e.g., a device at the user area 108) when the user is present in their user area 108.

It should be noted that in an alternative embodiments, the login communication module 406 and/or the routing communication module 408 may be located outside of the presence engine 308 but within the storage device 306 of the HUD server 110.

Because chat messages pass through the chat engine 318 of the HUD server 110, in accordance with some embodiments of the present invention, the chat presence module 410 will be able to easily detect the chat status of users that are chatting. Thus, the chat presence module 410 may determine which users are chatting based on chat messages being routed through the chat engine 318. If the user is chatting, then the user may be considered present according to an alternative embodiment.

The exemplary telephony presence module 412 may be configured to maintain the telephony status of local and remote users in accordance with another alternative embodiment. Since all telephony calls are directed through the PBX server 112, the PBX server 112 will know the status of users on calls. In this embodiment, the PBX server 112 may forward telephony status to the telephony presence module 412. The status may be forwarded periodically (e.g., every 2 minutes), as soon as a change is detected (e.g., a user picks up a line of the telephony device), or continuously in real-time. Alternatively, the telephony presence module 412 may pull the telephony status from the PBX server 112 periodically or continuously.

As previously noted, embodiments of the present invention may not embody the chat and telephony presence modules 410 and 412 or embody the functions within the presence status module 402. In some of these embodiments, the presence status module 402 may receive presence information from the communication servers or engines that manage inbound communications to determine presence status of users. In other embodiments, only presence status as determined by the presence detection module 206 or 210 are used.

Figure 5:
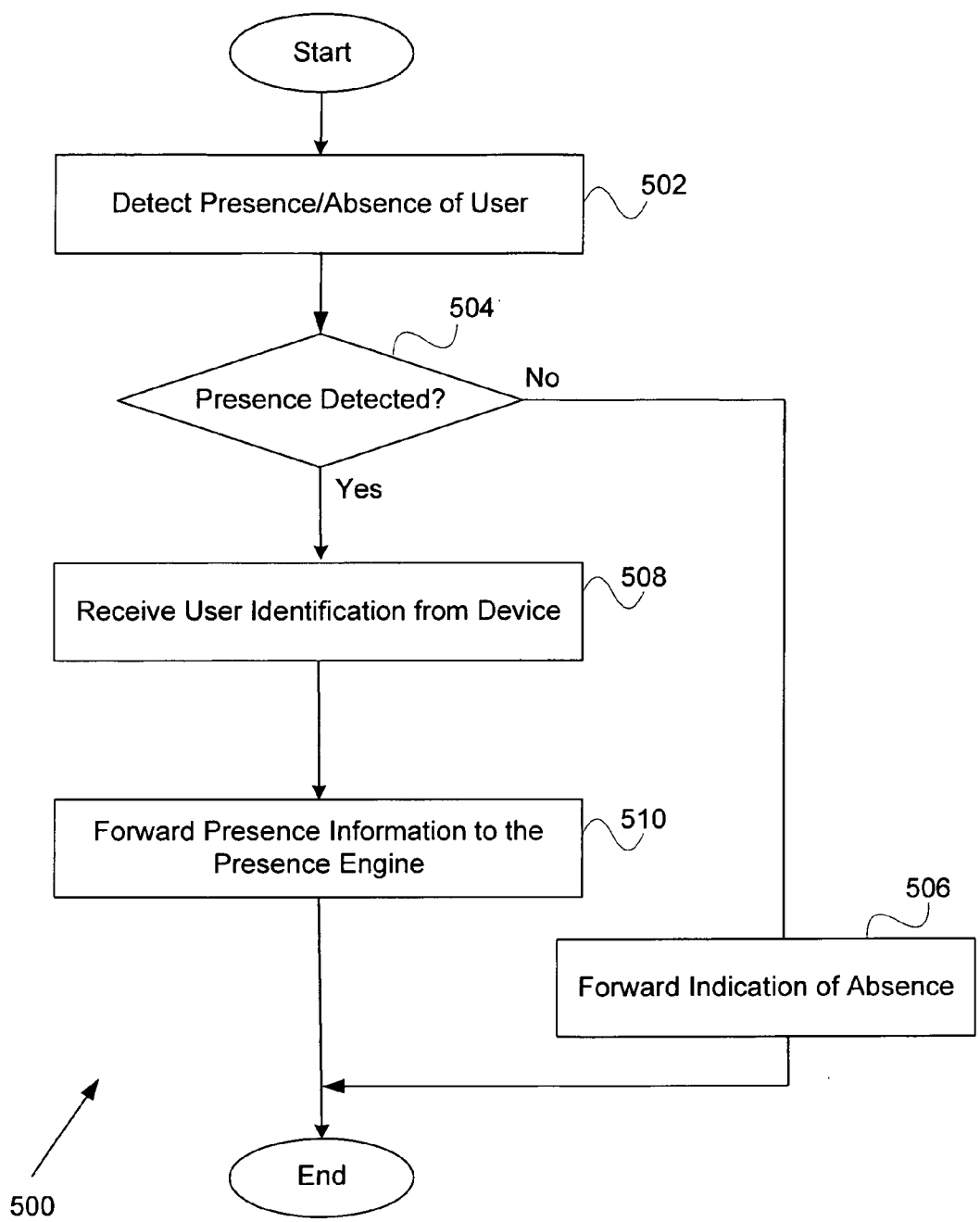
FIG. 5 is an exemplary flowchart of a method for presence detection at the user area.

Referring now to FIG. 5, a flowchart 500 of an exemplary method for presence detection at the user area 104 is shown. In step 502, the presence or absence of the user is detected. In some embodiments, the presence detection module 206 or 210 will detect or not detect a frequency or signal (e.g., presence indication signal) from one or more communication devices 202 or the user presence device 216. For example, the presence detection module 206 or 210 may detect a Bluetooth signal from a Bluetooth enabled device (e.g., mobile phone). In other embodiments, the presence detection module 206 detects the movement or lack of movement of input devices (e.g., keyboard and/or mouse). In yet other embodiments, the presence detection module 206 may be embodied within a GPS system. The presence detection module 210 may be a stand-alone unit coupled to one or more communication devices 202 in accordance with some embodiments. It should be noted that any one or more of these presence detection methods may be utilized at any one time in exemplary embodiments of the present invention.

In step 504, a determination is made as to whether a presence is detected. If no presence is detected, the indication of absence may be sent to the presence engine 308 in step 506. Alternatively, the presence detection module 206 or 210 may perform no action in the absence of presence. It should be noted that steps 504 and 506 may be optional or removed in accordance with alternative embodiments. For example, the presence information may be sent to the presence engine 308 regardless of whether presence is detected.

If presence is detected in step 504, then in accordance with one embodiment, a user/device identification may be received from the communication device 202 in optional step 508. In some embodiments, user may share a user area 104 or users may wander between user areas 104 but still want to be reachable. In these embodiments, the presence detection module 206 or 210 may need to identify the user within a particular user area 108. Thus, the communication device 202 or user presence device 216 being carried by the user may provide a unique identifier (e.g., a serial number, MAC address, mobile phone number, etc.) that will indicate the device 202 or 216 and/or the user associated with the device 202 or 216. In some embodiments, a record of these unique identifiers may be stored in, or associated with, a user's profile.

In step 510, the presence information is sent to the presence engine 308. In some embodiments, the presence information may comprise an indication that the user in the user area 104 is present or not present. In other embodiments, the presence information may include the unique identifier associated with the communication device 202 or user presence device 216.

Figure 6:
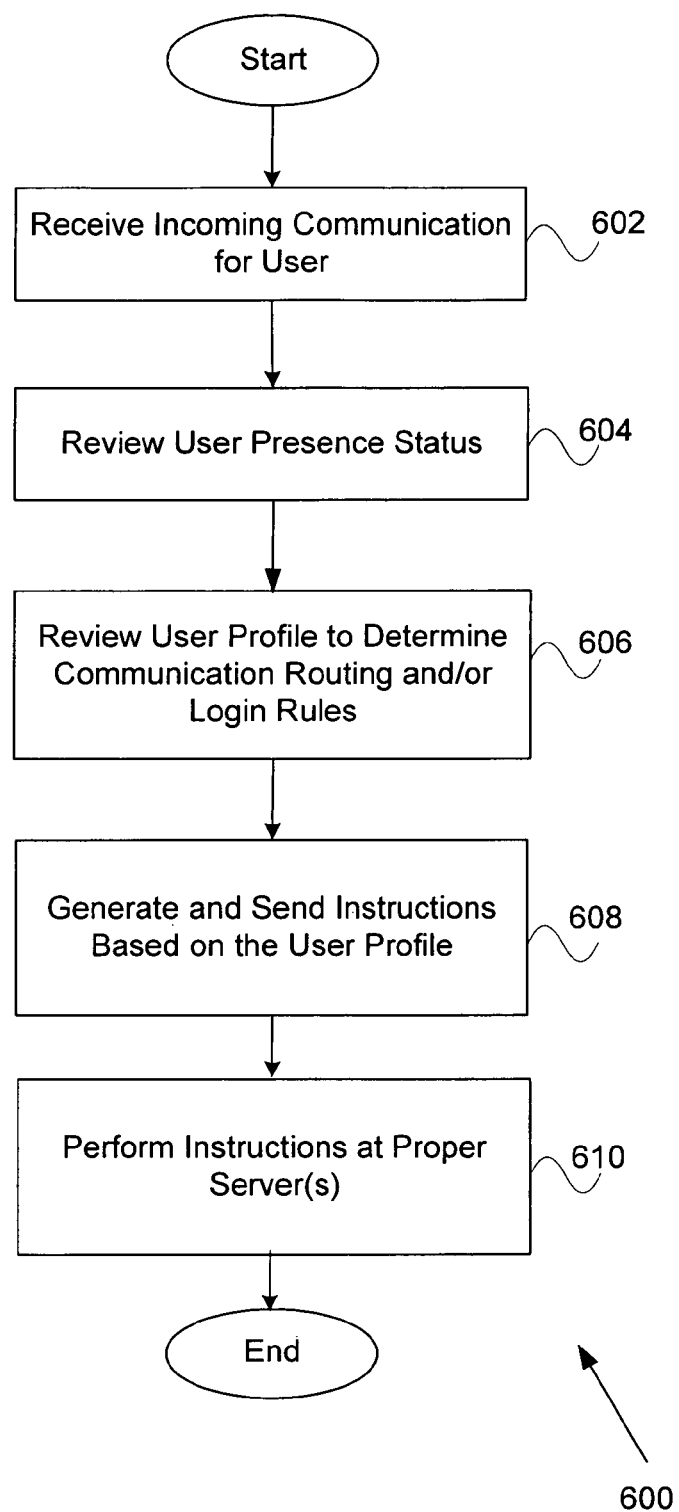
FIG. 6 is an exemplary flowchart of a method for routing communication based on smart presence management.

Referring now to FIG. 6, a flowchart 600 of a method for communication routing in a communication routing system is provided. In exemplary embodiments, the communication routing may occur in real-time. In step 602, an inbound communication is received for the user. For example, an e-mail may be received by the e-mail server 114 addressed to the user, or a phone call for the user is received by the PBX server 112.

The user's presence status is reviewed in step 604 to determine if the inbound communication may be forwarded to the user and/or to determine to which communication device the inbound communication should be routed. In exemplary embodiments, the presence status module 402 determines the status by reviewing the presence database 316. Alternatively, the presence status module 402 may request, in real-time, the presence status from one or more presence detection modules 206.

In step 606, the profile lookup module 404 looks up the associated user profile stored in the profile database 314 to determine communication routing and/or login/logout rules for the user. For example, if the user is not at their desk, the profile rules may instruct that an e-mail be forwarded to a mobile device associated with the user. Alternatively, if the user is at the user's desk (e.g., present in their user area 108), the profile rule may instruct that the e-mail be forwarded to the user's computing device at their desk.

It should be noted that more than one rule or action may be provided for a specific situation in the profile. For example, if the user is not present, the profile rule may provide that the user be logged out of a call queue and that inbound communications be routed to another user.

Once the profile is reviewed, appropriate instructions are generated and sent to perform the proper action as provided by the profile in step 608. In exemplary embodiments, the routing communication module 408 generates routing instructions to direct routing to the appropriate device(s). In other embodiments, the login communication module 406 may generate login instructions to direct one or more communication device(s) or communication server device(s) to log the user in or out. The instructions are then sent to the appropriate device(s).

In step 610, the device(s) performs the instructions received from the HUD server 110. Thus, for example, the PBX server 112 may route a phone call to a user's desk phone or mobile phone as instructed.

Figure 7:
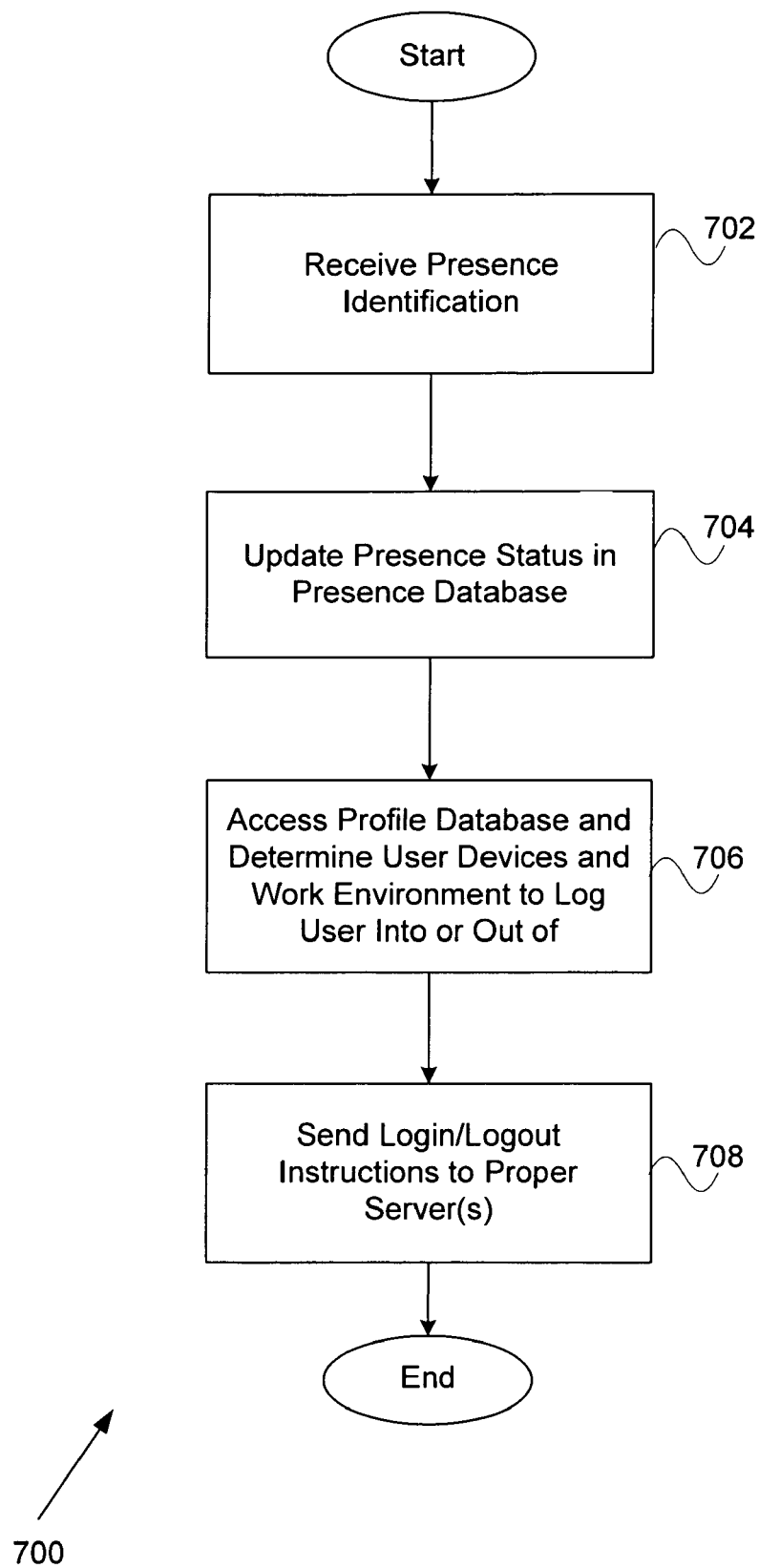
FIG. 7 is an exemplary flowchart of a method for automated login/logout of the user.

Referring now to FIG. 7, a flowchart 700 of an alternative process for intelligent presence management in a communication routing system is shown. In accordance with some embodiments, the communication routing system may log a user in or out or direct communications accordingly based on the user's presence status regardless of inbound communications being directed to the user.

In step 702, the presence information is received from the presence detection module 206. In some instances, the presence information may identify the user via a key card or an employee identifier obtained from the communication device. Alternatively, the presence status module 402 may receive presence information for the user and identify the user based on the associated presence detection module 206 that is sending the presence status. In exemplary embodiments, the presence information may be received continuously, periodically, based on an event (e.g., when the presence detection module 206 detects no movement after a predetermined period of time), or any other time. In some embodiments, the presence status/information is updated in the presence database 316 in step 704. In an alternative embodiment, the presence status may be determined in real-time and not stored.

The profile lookup module 404 accesses the profile database 314 to determine, based on the presence status, what actions should be performed. In the present embodiment, a determination is made as to whether the user should be logged into or out of a user device or work environment in step 706. For example, if the user is logged in to receive e-mails but their keyboard and mouse has not move in over 30 minutes, the user's profile may comprise a rule to log the user out with the e-mail server 114. Alternatively, if the user walks into their user area 108 and their user presence device 216 is detected, a rule may indicate that the user should be logged in to receive inbound communications (e.g., log the user into the call center communication queue).

Instructions to log the user in or out are generated and sent in step 708. In exemplary embodiments, the login communication module 406 will generate and send the instructions to the appropriate communication devices or communication server device(s) to log the user in or out. In an alternative embodiment, instructions may be sent to the user's communication device, itself, to log the user in or out. Alternatively, the routing communication module 408 may generate and send instructions to one or more communication servers to route an inbound communication according to the settings of the profile. The device(s) then perform the instructions to log the user in or out accordingly.

The above-described components and functions can be comprised of instructions that are stored on a computer-readable or machine-readable storage medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with the invention. Those skilled in the art are familiar with instructions, processor(s), and storage medium.

The present invention has been described above with reference to exemplary embodiments. It will be apparent to those skilled in the art that various modifications may be made and other embodiments can be used without departing from the broader scope of the invention. Therefore, these and other variations upon the exemplary embodiments are intended to be covered by the present invention.

What is claimed is:

1. A method for intelligent presence management in a communication routing system, comprising:
 receiving an inbound communication for a user;
 determining a presence status for the user;
 reviewing a profile associated with the user to determine where to route the inbound communication based on the presence status;
 generating and forwarding instructions for routing the inbound communication based on the profile;
 determining if the user should be logged in or out with the communication routing system based on the presence status; and
 generating and forwarding instructions to log the user in or out with the communication routing system.

2. The method of claim 1 wherein determining a presence status comprises receiving presence information from a presence detection module.

3. The method of claim 2 wherein the presence information comprises a unique identifier associated with the user.

4. The method of claim 2 wherein the presence information is based on mouse and keyboard movement.

5. The method of claim 2 wherein the presence information is based on a presence indication signal.

6. The method of claim 5 wherein the presence indication signal comprises a Bluetooth signal from a Bluetooth enabled device.

7. The method of claim 1 further comprising establishing and updating the profile associated with the user.

8. The method of claim 1 wherein logging the user in or out with the communication system comprises logging the user into or out of a call queue of a call center.

9. The method of claim 1 further comprising routing the inbound communication to a predetermined communication device associated with the user based on the profile.

10. The method of claim 1 further comprising routing the inbound communication to an alternative person based on the user profile.

11. A system for intelligent presence management in a communication routing system, comprising:
   a presence status module configured to determine a presence status based on presence information received for a user;
   a profile lookup module configured to review a profile associated with the user to determine where to route an inbound communication based on the presence status;
   a communication routing module configured to generate instructions for forwarding an inbound communication to a communication device based on the profile; and
   a login communication module configured to generate and forward instructions to log the user in or out with the communication routing system based on the presence status and the profile.

12. The system of claim 11 further comprising at least one communication server device configured to receive the inbound communication and to route the inbound communication based on the instructions received from the communication routing module.

13. The system of claim 11 further comprising a profile setup module configured to establish and update the profile for the user.

14. A non-transitory machine readable medium having embodied thereon a program, the program providing instructions for a method for intelligent presence management in a communication routing system, the method comprising:
   receiving an inbound communication for a user;
   determining a presence status for the user;
   reviewing a profile associated with the user to determine where to route the inbound communication based on the presence status;
   generating and forwarding instructions for routing the inbound communication based on the profile;
   determining if the user should be logged in or out with the communication routing system based on the presence status; and
   generating and forwarding instructions to log the user in or out with the communication routing system.

15. A method for intelligent presence management in a communication routing system, comprising:
   determining a presence status for a user;
   reviewing a profile associated with the user to determine whether to log the user in or out with the communication routing system based on the presence status;
   generating and forwarding instructions for logging the user in or out with the communication routing system based on the profile.

16. The method of claim 15 wherein determining a presence status comprises receiving presence information from a presence detection module.

17. The method of claim 16 wherein the presence information is based on a presence indication signal.

18. The method of claim 15 wherein logging the user in or out with the communication routing system comprises logging the user in or out of a call queue of a call center.

19. The machine readable medium of claim 14 wherein determining a presence status comprises receiving presence information from a presence detection module.

20. The machine readable medium of claim 14 wherein the presence information comprises a unique identifier associated with the user.

* * * * *